(12) United States Patent
Papakipos et al.

(10) Patent No.: US 8,976,142 B2
(45) Date of Patent: *Mar. 10, 2015

(54) NAVIGATING APPLICATIONS USING SIDE-MOUNTED TOUCHPAD

(71) Applicant: Facebook, Inc., Menlo Park, CA (US)

(72) Inventors: Matthew Nicholas Papakipos, Palo Alto, CA (US); Matthew Cahill, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/445,989

(22) Filed: Jul. 29, 2014

(65) Prior Publication Data

US 2014/0333568 A1 Nov. 13, 2014

Related U.S. Application Data

(63) Continuation of application No. 14/153,910, filed on Jan. 13, 2014, now Pat. No. 8,866,786, which is a continuation of application No. 13/275,095, filed on Oct. 17, 2011, now Pat. No. 8,711,116.

(51) Int. Cl.
| | |
|---|---|
| *G06F 3/041* | (2006.01) |
| *G06F 3/0488* | (2013.01) |
| *G06F 1/16* | (2006.01) |
| *G06F 3/0485* | (2013.01) |
| *G06F 3/0354* | (2013.01) |

(52) U.S. Cl.
CPC .............. *G06F 3/0488* (2013.01); *G06F 1/169* (2013.01); *G06F 3/0485* (2013.01); *G06F 3/04883* (2013.01); *G06F 3/03547* (2013.01); *G06F 3/041* (2013.01); *G06F 2203/0339* (2013.01); *G06F 2203/04104* (2013.01)
USPC ........................................ 345/173; 178/18.01

(58) Field of Classification Search
USPC ................... 345/169, 173; 178/18.01; 463/37
See application file for complete search history.

(56) References Cited

U.S. PATENT DOCUMENTS

| | | | |
|---|---|---|---|
| 8,712,931 B1 * | 4/2014 | Wahlen | 706/12 |
| 2014/0125617 A1 * | 5/2014 | Papakipos et al. | 345/173 |

* cited by examiner

*Primary Examiner* — Abbas Abdulselam
(74) *Attorney, Agent, or Firm* — Baker Botts L.L.P.

(57) ABSTRACT

In one embodiment, a method includes detecting a touch event on a back-mounted touchpad of a computing device during display of a current user interface of an application executing on the computing device. The application includes a navigation hierarchy with a home user-interface layer, multiple sub user-interface layers, and multiple user-interface branches. The method includes determining a particular sub user-interface layer and user-interface branch that the current user interface corresponds to and determining a type of the touch event. When the type of the touch event is an upward touch event and there is a next sub user-interface layer in the particular user-interface branch of the current user interface, the method navigates to the next user-interface layer in the particular user-interface branch of the current user interface.

19 Claims, 13 Drawing Sheets

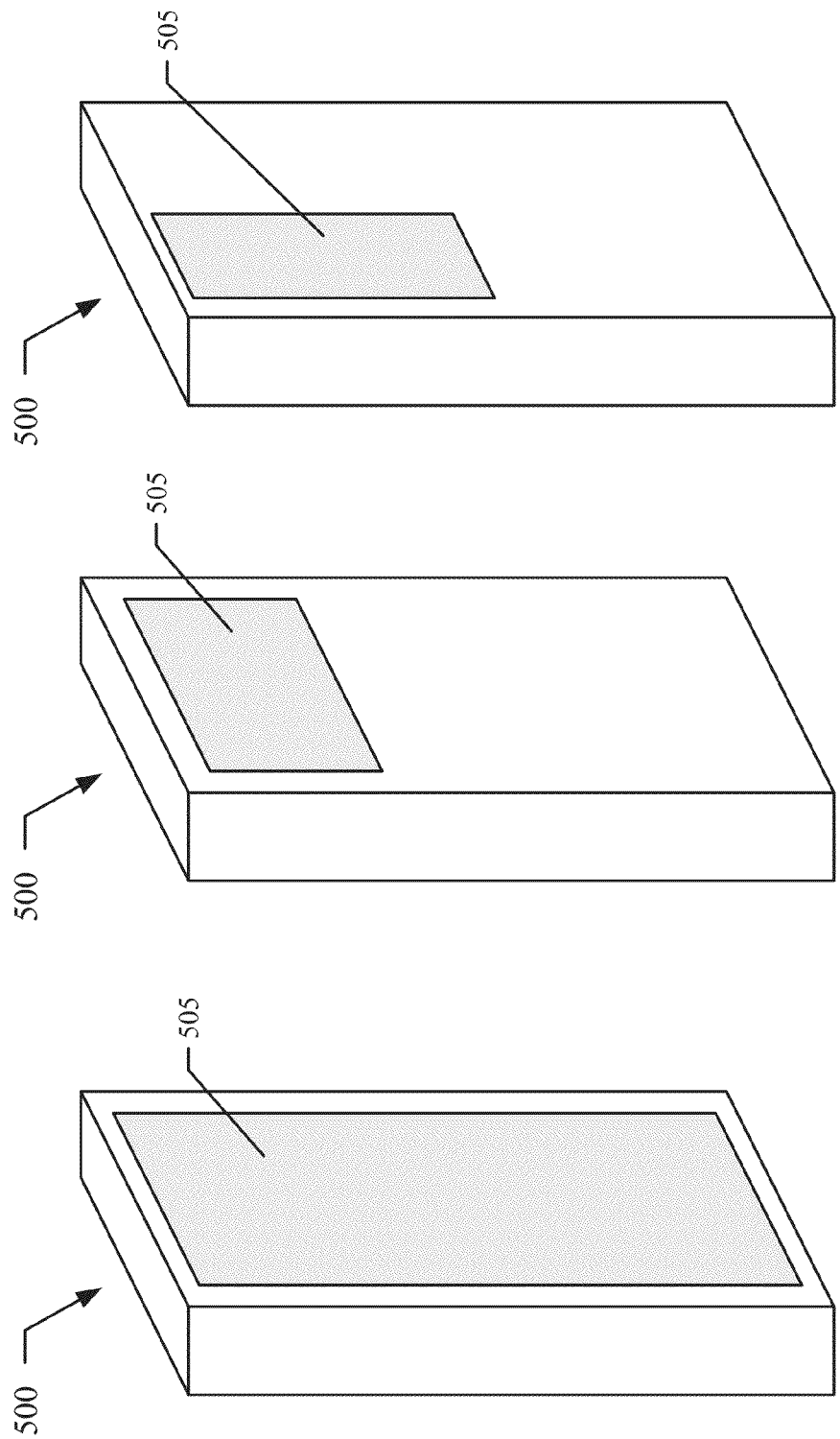

NAVIGATING APPLICATIONS USING SIDE-MOUNTED TOUCHPAD

PRIORITY

This application is a continuation under 35 U.S.C. §120 of U.S. patent application Ser. No. 14/153,910, filed 13 Jan. 2014, which is a continuation under 35 U.S.C. §120 of U.S. patent application Ser. No. 13/275,095, filed 17 Oct. 2011.

TECHNICAL FIELD

The present disclosure relates generally to touch-based user interfaces, and more particularly to, navigating between user interface layers of an application hosted by a computing device having a side-mounted touchpad.

BACKGROUND

A touchpad is an input device including a surface that detects touch-based inputs of users. A touch screen is an electronic visual display that detects the presence and location of user touch inputs. Mobile devices such as a mobile phone, a tablet computer, and a laptop computer often incorporate a touch screen or a touchpad to facilitate user interactions with application programs running on the mobile device.

SUMMARY

Particular embodiments relate to touch-based user interfaces that allow a user of a computing device to navigate between application user interface layers by using touch inputs to a side-mounted touchpad. These and other features, aspects, and advantages of the disclosure are described in more detail below in the detailed description and in conjunction with the following figures.

BRIEF DESCRIPTION OF THE DRAWINGS

FIG. 5B illustrates an example mobile device with a back-mounted touch surface.

DESCRIPTION OF EXAMPLE EMBODIMENTS

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1:
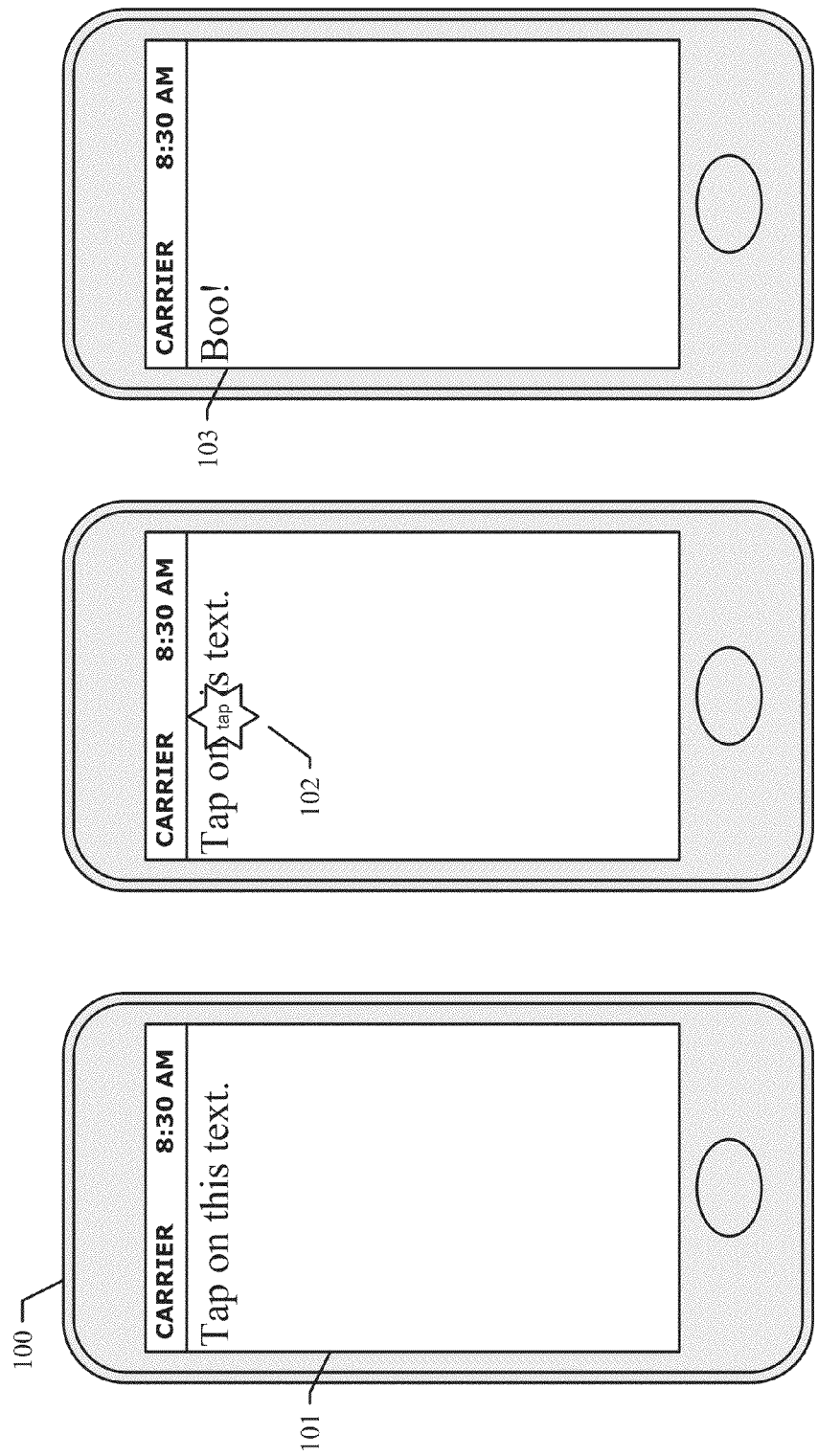
FIG. 1 illustrates an example touch screen of a mobile phone that hosts a browser client displaying a web page.

A touchpad is an input device including a surface that detects touch-based inputs of users. Similarly, a touch screen is an electronic visual display that detects the presence and location of user touch inputs. So-called dual touch or multi-touch displays or touchpads refer to devices that can identify the presence, location and movement of more than one touch input, such as two or three finger touches. A system incorporating one or more touch-based input devices may monitor one or more touch-sensitive surfaces for one or more touch or near touch inputs from a user. When one or more such user inputs occur, the system may determine the distinct area(s) of contact and identify the nature of the touch or near touch input(s) via geometric features and geometric arrangements (e.g., location, movement), and determine if they correspond to various touch events (e.g., tap, drag, swipe, pinch). These touch events may then be processed by handler functions that register or subscribe as listeners to such events, as illustrated in FIG. 1. FIG. 1 illustrates an example touch screen of a mobile phone that hosts a browser client displaying a web page. In the example of FIG. 1, touch screen 101 of mobile phone 100 displays an HTML/JavaScript code snippet displaying a text string "Tap on this text", as listed below.

```
<html>
<!-- pseudo-code to include a touch event listener from a touch events
library
library TouchEventsLibrary
function onTapEvent
-->
<body>
<h1 onTapEvent="this.innerHTML='Boo!'">Click on this text</h1>
</body>
</html>
```

As a user taps on the text string "Tap on this text." (102), a touch event listener "onTouchEvent" can trigger an action of changing the text string from "Tap on this text." to "Boo!" (103).

Figure 2:
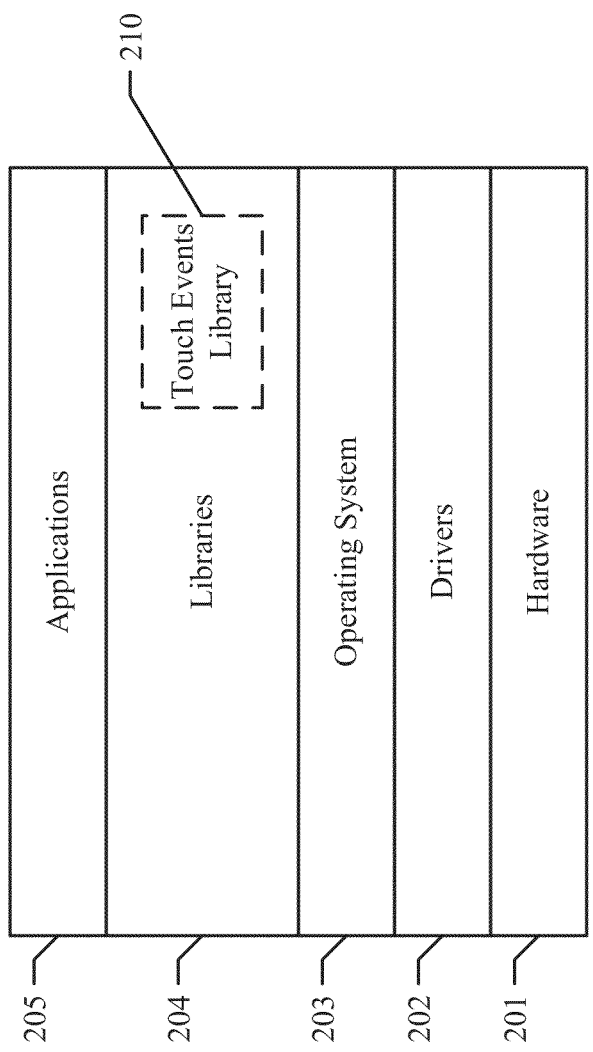
FIG. 2 illustrates an example processing stack of a mobile device with touch-based input device(s).

Recognition of touch events by a system with one or more touch-based input devices—i.e., identifying one or more touch inputs by a user and determining corresponding touch event(s)—may be implemented by a combination of hardware, software, and/or firmware (or device drivers). FIG. 2 illustrates an example processing stack of a mobile device (e.g., a smart phone) with touch-based input device(s). Hardware layer 201 can include one or more processors and various hardware input/output devices such as camera, communication interface, and touch-based input device (e.g., touch screen, touchpad). Drivers layer 202 includes one or more drivers that communicate and control hardware layer 200, for example, a driver receiving and processing touch input signals generated by a touch-screen display. Operating system 203 runs computing programs and manages hardware layer 201 via one or more drivers in driver layer 202. Libraries 204 include one or more libraries used by one or more application programs in applications 205 (e.g., web browser, address book, etc.). For example, touch events library 210 can contain codes that interpret touch inputs to touch events or gestures, and a web browser application program can access touch event library 210 (e.g., via function calls) and process a web page with touch event handlers embedded within the page, as illustrated in FIG. 1 and in the HTML/JavaScript code snippet above.

User interface layers of application programs hosted by a computing device, including user interface layers of the computing device's operating system, are generally arranged in a hierarchy, such as a hierarchical tree structure. A root node of the tree structure may correspond to a home user interface layer or home screen of an application, including icons, buttons, pull-down menus, hypertext links or other controls that allow users to navigate to child user interface layers. Child user interface layers may include icons or buttons that allow users to navigate back to parent user interface layers by selecting an icon or button. Many such buttons are displayed on the top of a menu bar, but there are a lot of exceptions.

Figure 3A:
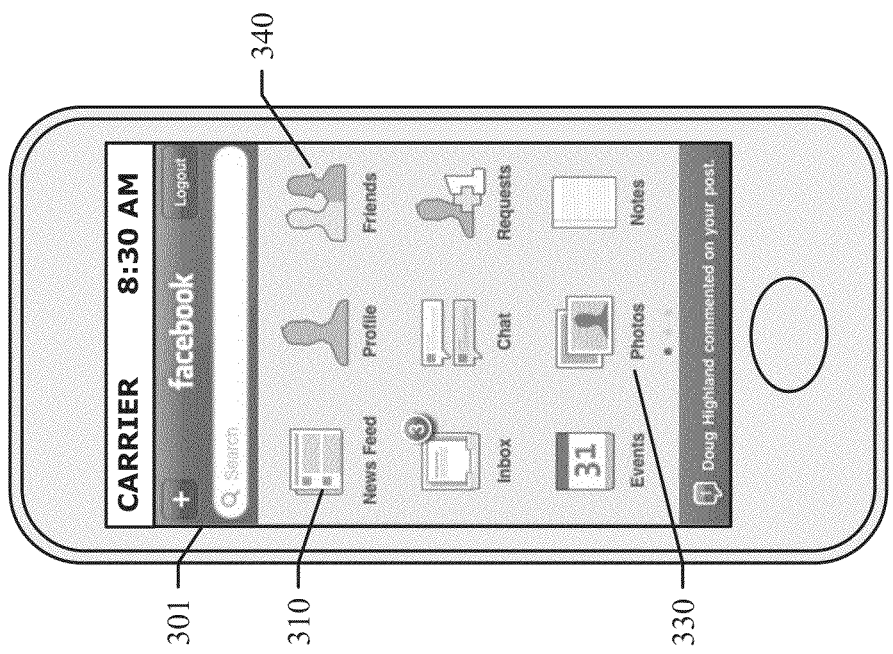
FIG. 3A-3C illustrate an example method of navigating between user interface layers of an application hosted on a touch-screen device.
Figure 3C:
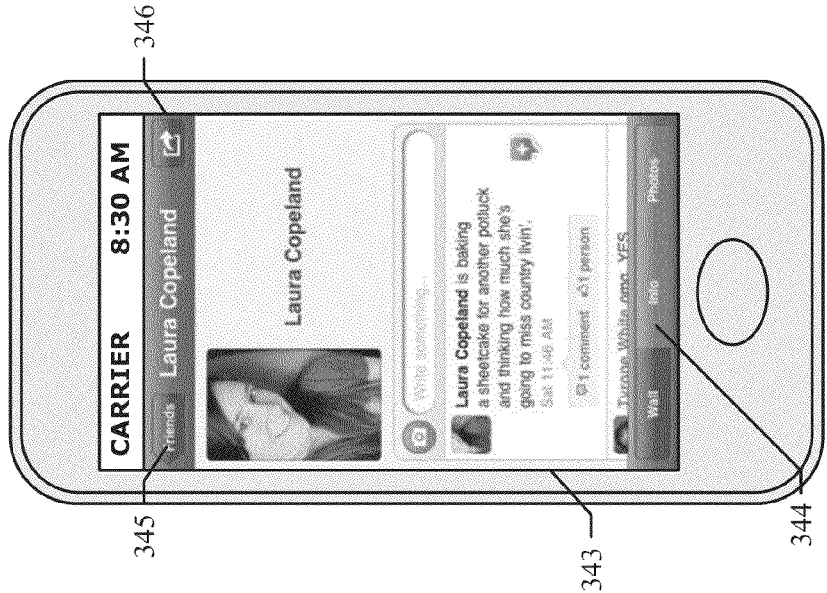
Figure 3B:
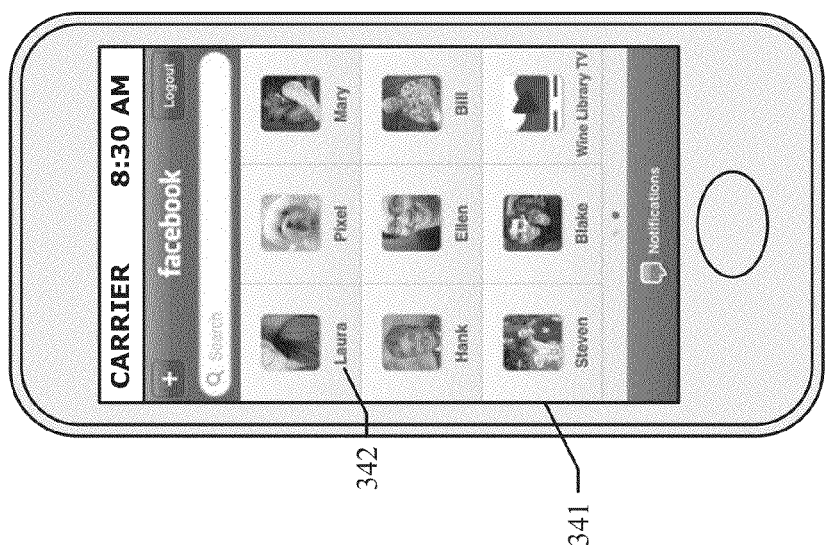

With a touch-screen device, a user can often navigate between user interface layers of an application hosted on the touch-screen device by touching one or more selectable elements within the application's user graphic interface displayed with the touch-screen, as illustrated in FIGS. 3A-3C. The particular application shown in FIGS. 3A-3C is a Facebook® client hosted by a mobile phone with a touch screen (e.g., an iPhone® smartphone offered by Apple, Inc. of Cupertino, Calif.). When a user launches the application, the application shows a home screen 301 (FIG. 3A), or an interface displaying home user interface layer of the application. The home screen 301 may include user interface elements such as icons or buttons for navigating to other layers, for example, News Feed icon 310, Photos icon 330, or Friends icon 340.

Figure 4:
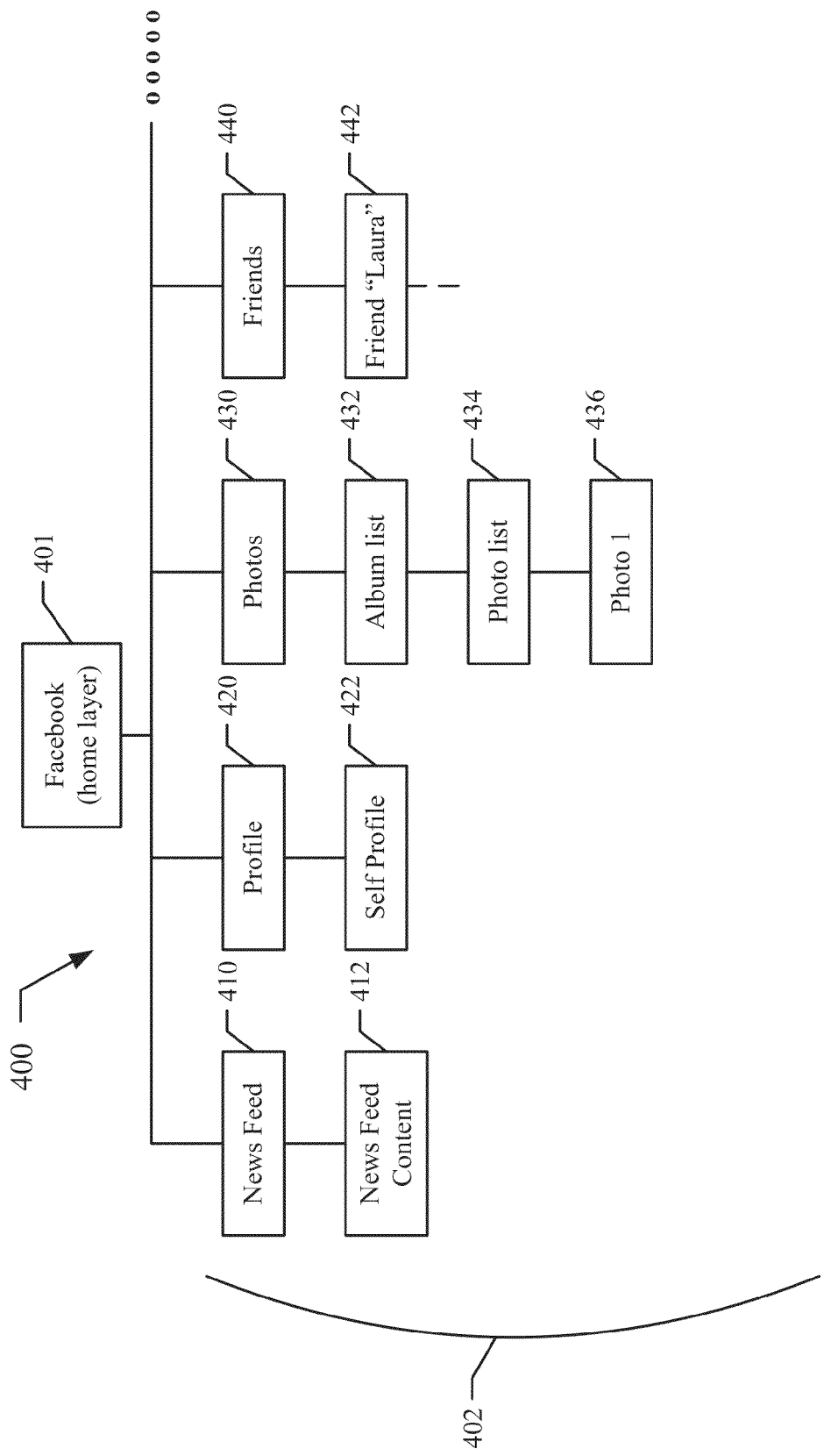
FIG. 4 illustrates an example application user interface hierarchy of an application hosted on a touch-screen device.

FIG. 4 illustrates an example application user interface hierarchy 400 of the application illustrated in FIGS. 3A-3C. The application user interface hierarchy includes home layer 401 and one or more sub-layers 402, such as News Feed 410, Profile 420, Photos 430, Friends 440, and the like. In addition, Photos layer 430 itself has a sub-layer of Album list 432 which in turn has a sub-layer Photo list 434, and so on. Not all layers have sub-layers, such as News Feed content 412, Self Profile content 422, "Photo 1" 436, which are leaf layers. In the example of FIG. 4, the nodes of the hierarchy represent different user interface layers provided by the application, while the edges between the nodes illustrate a potential navigation flow. Additionally, the application may allow for navigation among the nodes in a way that does not observe a hierarchical model, such as navigating directly between sibling node layers, traversing more than one hop directly between layers, and the like.

For example, from home layer 401, the user can navigate to Friends layer 440 by touching Friends icon 340 within home screen 301, the current screen will change to a screen 341 for Friends layer 440, as illustrated in FIG. 3B. The screen 341 for Friends layer 440 comprises a list of friends wherein each friend is represented by a selectable icon (e.g., a profile picture). The user can navigate to a particular friend layer "Laura" 442 by touching a corresponding icon (342), the current screen will change to a screen for the particular friend (343), as illustrated in FIG. 3C. From the particular friend layer "Laura" 442 or from the screen for the particular friend 343 illustrated in FIG. 3C, the user can look up additional information (e.g., an email address, a phone number) of the particular friend by touching "info" icon 344, navigate back to Friends layer by touching "Friends" icon 345, or navigating to home layer by touching home icon 346.

Figure 5:
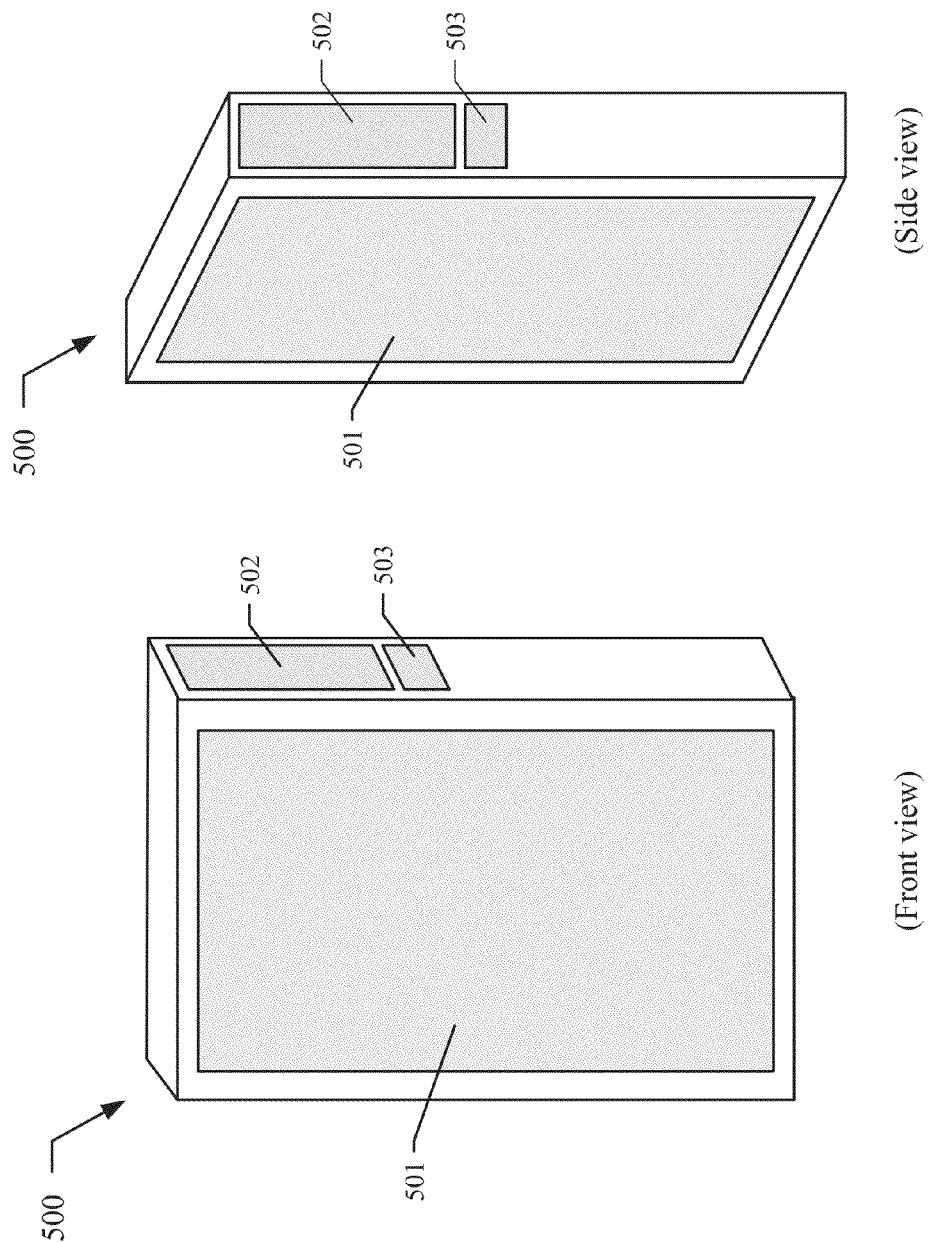
FIG. 5 illustrates a front view and a side view of an example mobile device with a front-mounted touch screen and a side-mounted touchpad.
Figure 5A:
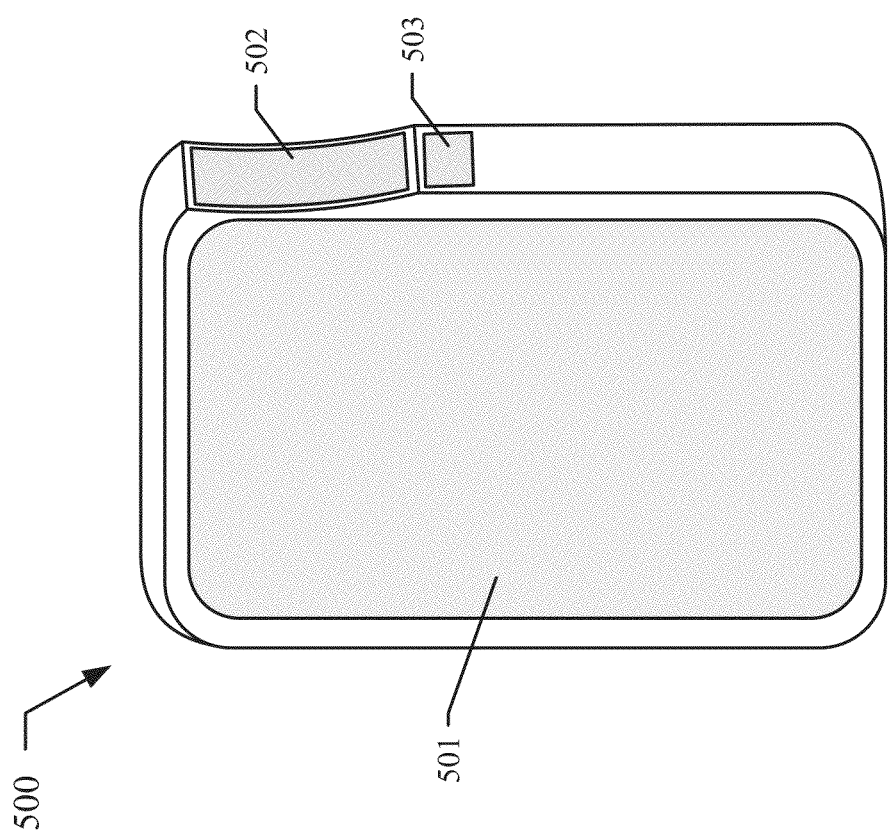
FIG. 5A illustrates another example of the mobile device of FIG. 5.

Particular embodiments herein relate to a computing device (such as a mobile phone, netbook, smartphone, tablet, or other portable device) with a touch screen and one or more side-mounted touchpads and methods of allowing users to use the one or more side-mounted touchpads to navigate between application user interface layers. Particular embodiments can improve user experience associated with mobile devices as the side-mounted touchpad(s) can offload user interaction to the side-mounted touchpad(s) and yield better usage of the touch screen (e.g., a less congested graphic user interface with less navigation elements or icons). FIG. 5 illustrates a front view and a side view of an example mobile device with a front-mounted touch screen and a side-mounted touchpad. In particular embodiments, mobile device 500 may comprise a housing with multi-touch touch screen 501 disposed on a front face of the housing. The mobile device 500 may also include a side-mounted multi-touch touchpad 502 and a side-mounted single-touch touchpad 503, both disposed on a lateral face or edge of the device 500. In particular embodiments, mobile device 500 may include hardware and/or software that supports or implements a variety of functions. For example, mobile device 500 may support telephony functions, chat and/or email functions. Mobile device 500 may also support network data communications and include a web browser for accessing and displaying web pages. Mobile device 500 may also support or incorporate, a Wi-Fi base station functions, a digital media player functions, and/or a gaming device functions. In one embodiment, the side-mounted touchpad 503 may be replaced by a clickable button or keypad device. In another embodiment, the side-mounted touchpad 503 may be a multi-touch touchpad. In some implementations, the touchpad 402 may be a single- or multi-touch device. In some embodiments, side-mounted touchpad 502 may comprise a slightly concave multi-touch surface, as illustrated in FIG. 5A. The touch screen 501 and side-mounted touchpad 503 may be single-touch, dual-touch or multi-touch devices. In addition, implementations of the invention can operate without a touch screen device, relying instead on a regular display device and a pointer device, such as a trackball or trackpad. In other embodiments, mobile device 500 may include a back-mount touch surface 505 on a back-side of mobile device 500. The back-mounted touch 505 may cover substantially all or a portion of a back side of mobile device 500, as illustrated in FIG. 5B. The back-mounted touch surface 505 may comprise a multi-touch touchpad or a multi-touch touch screen.

Figures 5C, 5D:
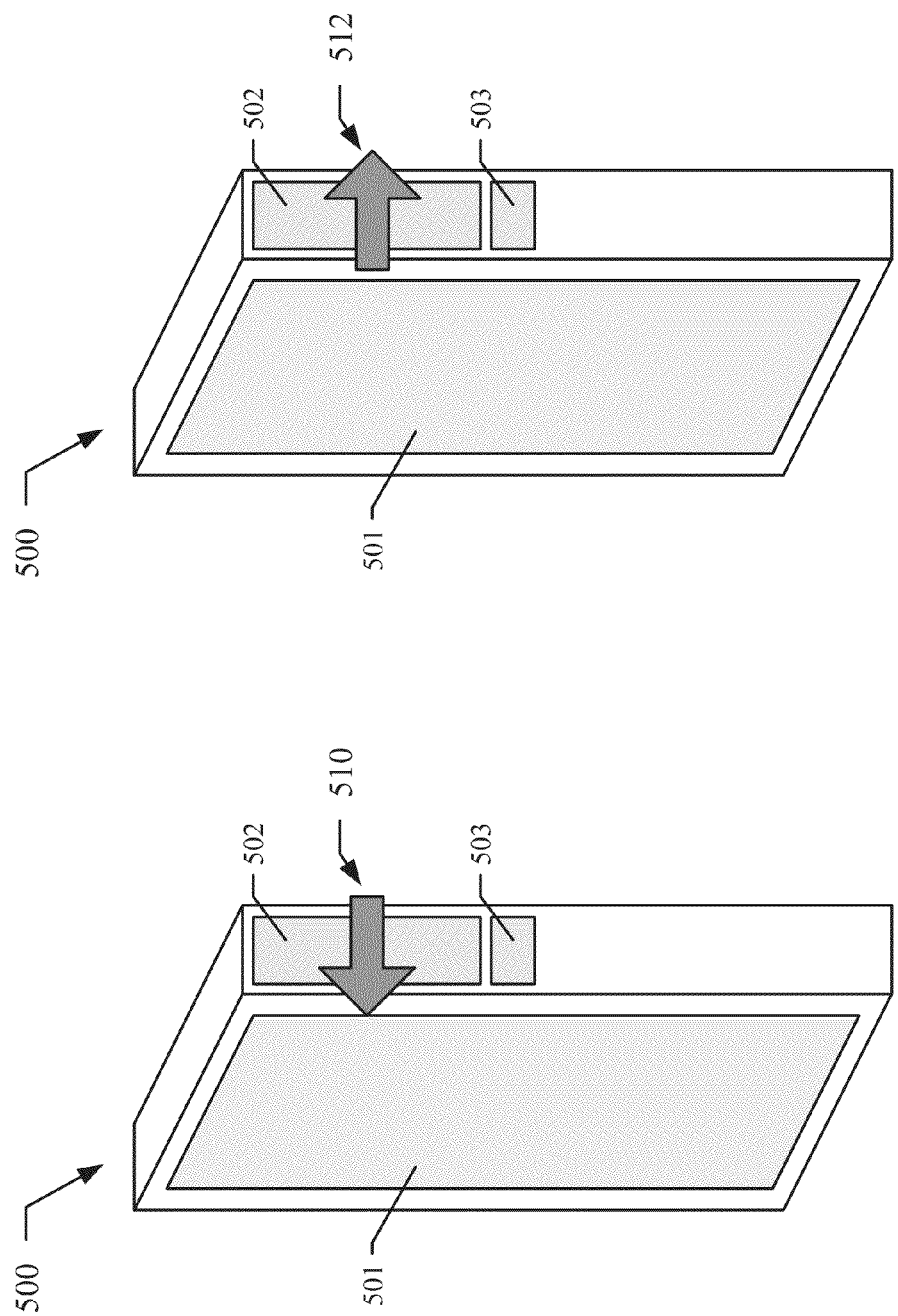
FIGS. 5C-5F illustrate example touch events associated with the one or more side-mounted touchpads of the example mobile device of FIG. 5.

Mobile device 500 may recognize touch inputs, and determine one or more corresponding touch events or gestures. One or more applications hosted on mobile device 500 may be configured to register a handler function that responds to the one or more touch events. In particular embodiments, mobile device 500 may recognize one or more user touch inputs performed on touch screen 501, touchpad 502, touchpad 503, and/or back-mounted touch surface 505, and determine one or more corresponding touch events. In particular embodiments, mobile device 500 may determine a forward lateral flick event associated with touchpad 502, as illustrated in FIG. 5C. In the example of FIG. 5C, a user touches touchpad 502 in a quick motion in forward lateral direction (indicated by the arrow 510), and a gesture recognition library of mobile device 500 can access data generated by touchpad 502 and determine the touch input corresponding to a forward lateral flick event or gesture associated with touchpad 502. In particular embodiments, mobile device 500 may determine a backward lateral flick event associated with touchpad 502, as illustrated in FIG. 5D. In the example of FIG. 5D, a user touches touchpad 502 in a quick motion in backward lateral direction (indicated by the arrow 512), and a gesture recognition library of mobile device 500 can access data generated by touchpad 502 and determine the touch input corresponding to a backward lateral flick event or gesture associated with touchpad 502.

Figures 5E, 5F:
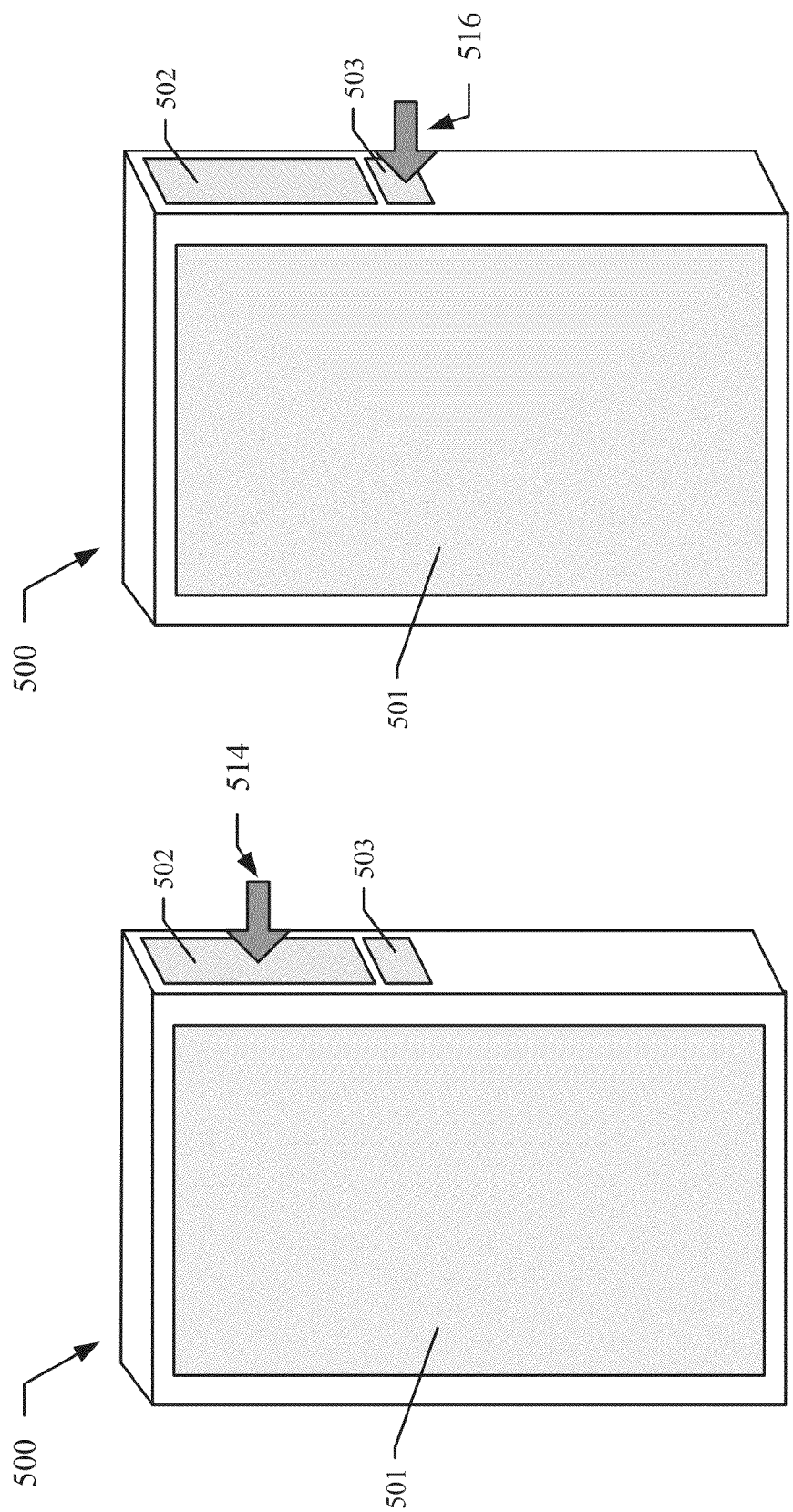

In particular embodiments, mobile device 500 may identify a tap event. In some embodiments, mobile device 500 may determine a tap event associated with touchpad 502, as illustrated in FIG. 5E. In the example of FIG. 5E, a user taps or strikes lightly on touchpad 502 (indicated by the arrow 514), and a gesture recognition library of mobile device 500 can interpret the user's touch input and identify the touch input corresponding to a tap event. In other embodiments, mobile device 500 may identify a tap event associated with touchpad 503, as illustrated in FIG. 5F. In the example of FIG. 5F, a user taps or strikes lightly on touchpad 503 (indicated by the arrow 516), and a gesture recognition library of mobile device 500 can interpret the user's touch input and identify the touch input corresponding to a tap event. In one embodiments, mobile device 500 may identify a tap event associated with touchpad 503 if touchpad 503 is a clickable button and a user clicks on the clickable button.

Figure 5I:
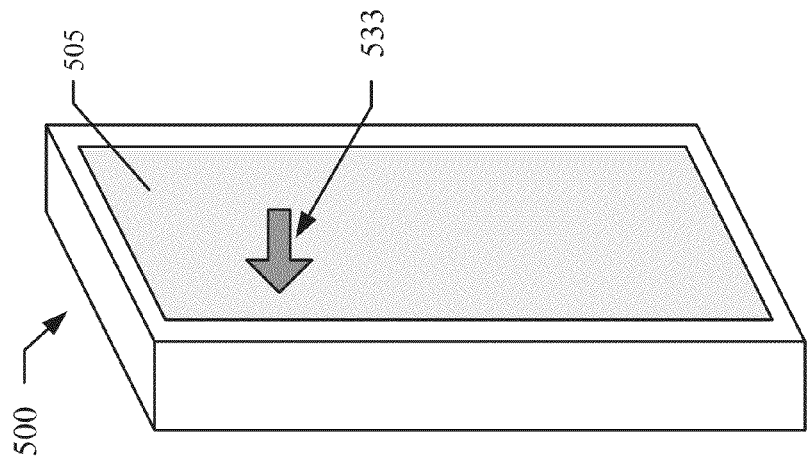
FIGS. 5G-5I illustrate example touch events associated with a back-mounted touch surface of the example mobile device of FIG. 5B.
Figure 5H:
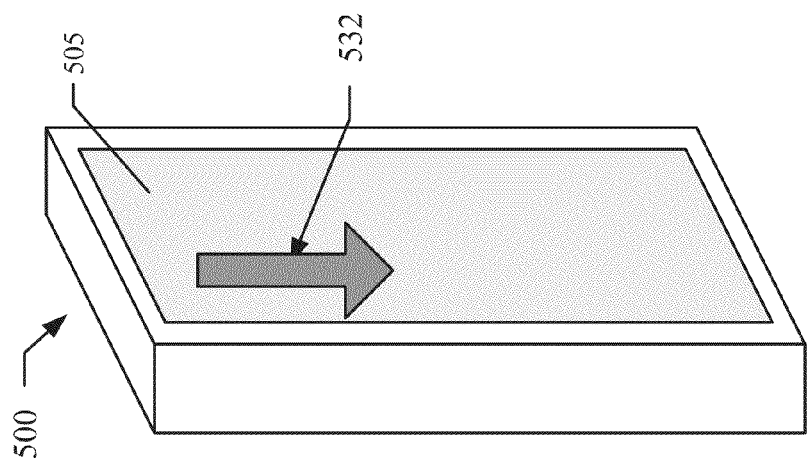
Figure 5G:
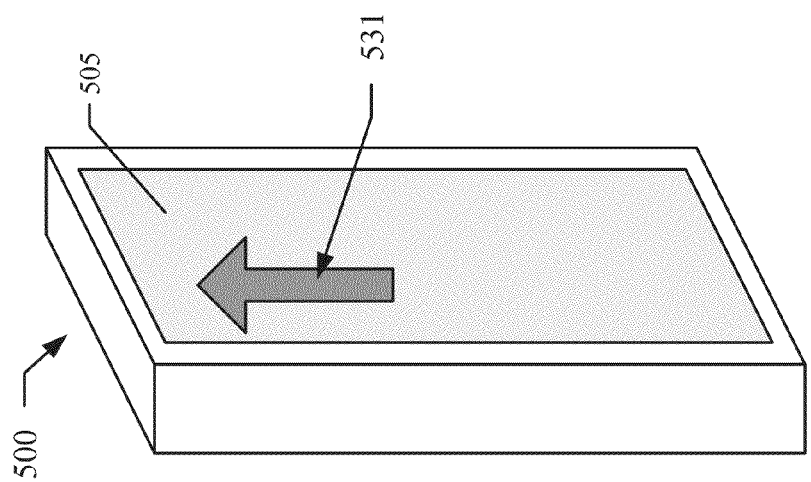
Figure 6:
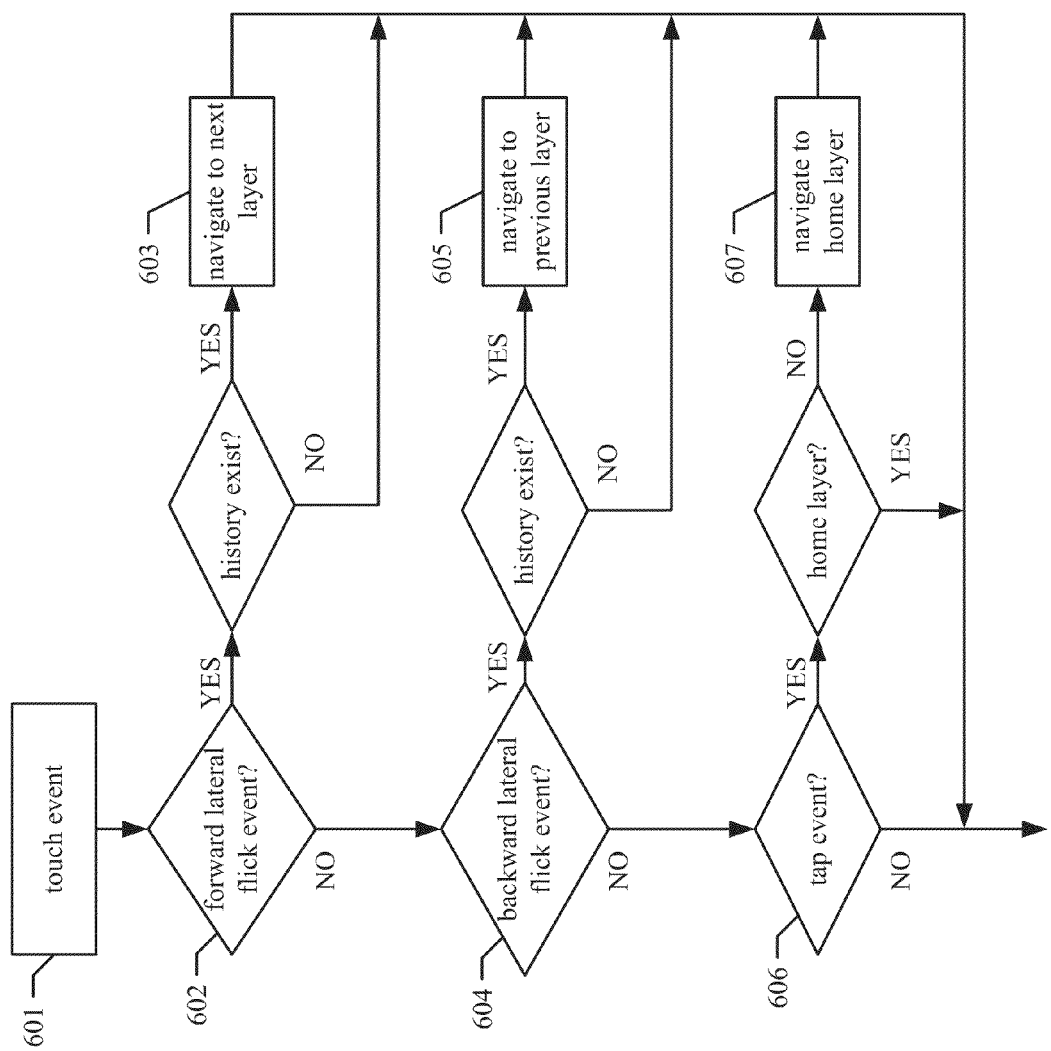
FIG. 6 illustrates an example method of navigating between user interface layers of an application using side-mounted touchpads.

In other embodiments, mobile device 500 may identity touch events associated with back-mounted touch surface 505, as illustrated in FIGS. 5G-5I. In the example of FIG. 5G, a user touches back-mounted touch surface 505 in a quick motion in an upward direction (indicated by the arrow 531). A gesture recognition library of mobile device 500 can interpret the user's touch input and identify the touch input corresponding to an upward flick event or gesture associated with back-mounted touch surface 505. In the example of FIG. 5H, a user touches back-mounted touch surface 505 in a quick motion in a downward direction (indicated by the arrow 532). A gesture recognition library of mobile device 500 can interpret the user's input and identify the touch input corresponding to a downward flick event or gesture associated with back-mounted touch surface 505. In the example of FIG. 5I, a user taps or strikes lightly on back-mounted touch surface 505 (as indicated by the arrow 533). A gesture recognition library of mobile device 500 can interpret the user's input and identify the touch input corresponding to a tap event associated with back-mounted touch surface 505.

In contrast to navigating between user interface layers of an application by touch inputs to a touch screen as illustrated in the example in FIGS. 3A-3C, FIG. 6 illustrates an example method of navigating between user interface layers of an application using side-mounted touchpads. Specifically, the example method of FIG. 6 may enable a user to navigate between user interface layers by flicking across a side-mounted touchpad, to jump to the application's home screen by tapping or clicking a side-mounted "home button". As a listener for touch events (601), the handler function can, responsive to a touch event, cause an application to navigate to a different user interface layer. In particular embodiments, when a touch event occurs (601), the handler function may determine a current application layer corresponding to the touch event. In particular embodiments, the application may store a navigation history that tracks the layers to which the user has navigated. In particular embodiments, the handler function may determine if the touch event is a forward lateral flick event (602). In particular embodiments, if the touch event is a forward lateral flick event, and if the forward navigation history identifies a next layer for the current layer, the handler function may cause the application navigate to the next layer (603). In particular embodiments, the handler function may determine if the touch event is a backward lateral flick event (604). In particular embodiments, if the touch event is a backward lateral flick event, and if the backward navigation history identifies a previous layer for the current layer, the handler function may cause the application navigate to the previous layer (605). In particular embodiments, the handler function may determine if the touch event is a tap event in connection with input device 503 (606). In particular embodiments, if the touch event is a tap event, and if the current layer is not a home layer, the handler function may cause the application navigate to the home layer (607).

Additionally, particular embodiments may enable navigating between user interface layers of an application using the back-mounted touch surface described earlier. For example, as a listener for touch events, the handler function can, responsive to a touch event, cause an application to navigate to a different user interface layer. When a touch event occurs, the handler function may determine a current application layer corresponding to the touch event. The application may store a navigation history that tracks the layers to which the user has navigated. The handler function may determine if the touch event is an upward flick event associated with back-mounted touch surface 505. If the touch event is an upward flick event associated with back-mounted touch surface 505, and if the forward navigation history identifies a next layer for the current layer, the handler function may cause the application to navigate to the next layer. The hander function may determine if the touch event is a downward flick event associated with back-mounted touch surface 505. If the touch event is a downward flick event associated with back-mounted touch surface 505, and if the backward navigation history identifies a previous layer for the current layer, the handler function may cause the application navigate to the previous layer. The handler function may determine if the touch event is a tap event associated with back-mounted touch surface 505. If the touch event is a tap event associated with back-mounted touch surface 505, and if the current layer is not a home layer, the handler function may cause the application to navigate to the home layer.

The forward and back gestures, as well as the home control input, described above can be utilized in connection with a variety of applications and computing devices. For example, as discussed above, the forward and back gestures, as well as the home control input, may be used in connection with a special-purpose client application in order to facilitate navigation of the various application layers. In such an implementation, the home input causes navigation back to the home or root layer of the application. The forward and back gestures, as well as the home control input, may also be used in connection with a browser client to facilitate navigation of a series of web pages provided by one or more domains. In such an implementation, the home input may cause navigation back to a home page, while the forward and back gestures may implement corresponding forward and backward navigation functions common to browser client applications. In addition, the forward and back gestures, as well as the home control input, can be used in connection with a graphical user interface shell of an operating system. In such an implementation, the home input may cause navigation back to the home screen of the operating system, while the forward and back gestures may implement corresponding forward and backward navigation functions across various layers provided by the operating system shell.

Figure 7:
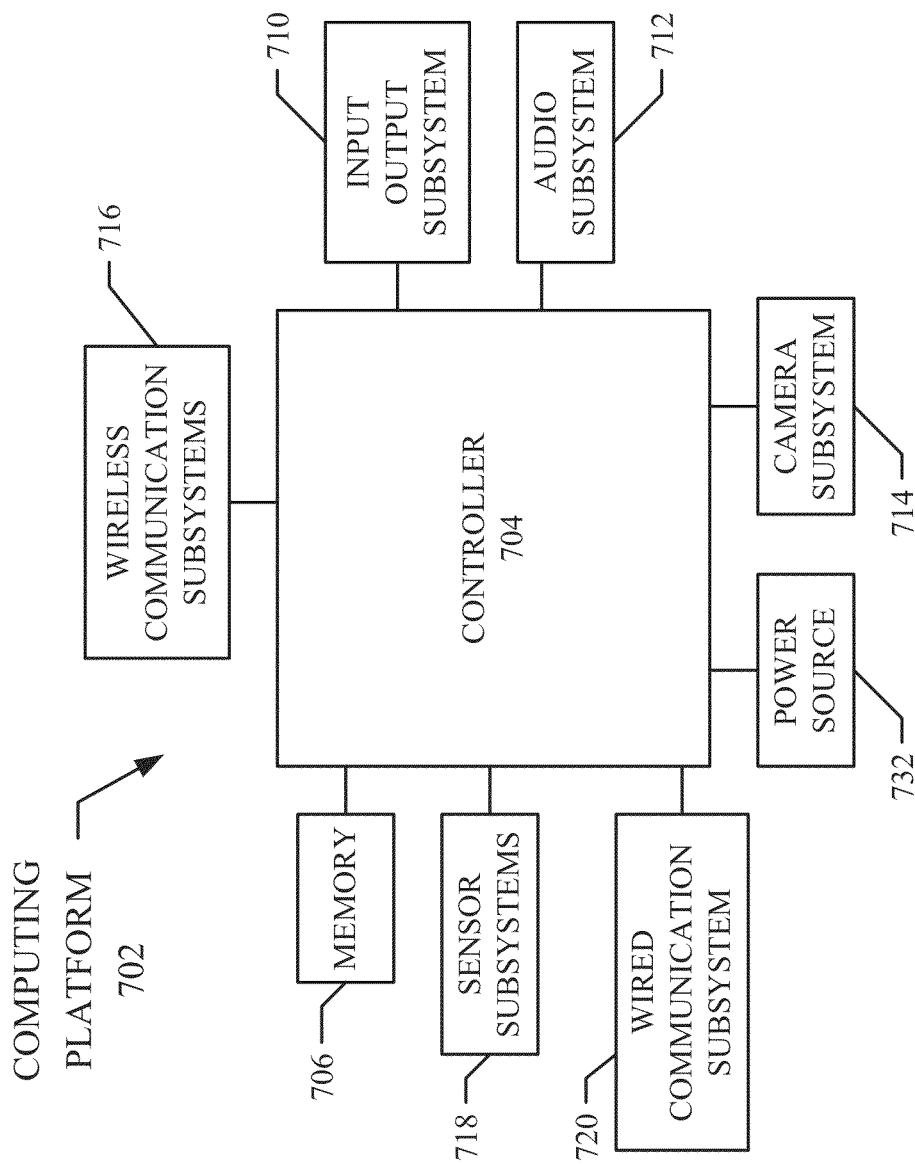
FIG. 7 illustrates an example mobile device platform.

The application and functionality described above can be implemented as a series of instructions stored on a computer-readable storage medium that, when executed, cause a programmable processor to implement the operations described above. While the mobile device 500 may be implemented in a variety of different hardware and computing systems, FIG. 7 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, Symbian-based, or Android-based among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input-output subsystem may include keyboard, mouse, one or more buttons, thumb wheel, and/or display (e.g., liquid crystal display (LCD), light emitting diode (LED), interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touchpad and touch screen. A touchpad is an input device including a surface that detects touch-based inputs of users. Similarly, a touch screen is a display that detects the presence and location of user touch inputs. Input output system 710 may also include dual touch or multi-touch displays or touchpads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 716 may include hosting protocols such that computing platform 702 may be configured as a base station for other wireless devices.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader). Other input/output devices may include an accelerometer that can be used to detect the orientation of the device.

In particular embodiments, various components of computing platform 702 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

This disclosure contemplates one or more computer-readable storage media implementing any suitable storage. In particular embodiments, a computer-readable storage medium implements one or more portions of controller 704 (such as, for example, one or more internal registers or caches), one or more portions of memory 705, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, JavaScript, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This scope of this disclosure encompasses all changes, substitutions, variations, alterations, and modifications to the example embodiments herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, detecting a touch event on a back-mounted touchpad of the computing device during display of a current user interface of an application executing on the computing device, wherein the application comprises a navigation hierarchy that comprises a home user-interface layer, a plurality of sub user-interface layers, and a plurality of user-interface branches;
   by the computing device, determining a particular sub user-interface layer and user-interface branch that the current user interface corresponds to;
   by the computing device, determining a type of the touch event;
   by the computing device, when the type of the touch event is an upward touch event and there is a next sub user-interface layer in the particular user-interface branch of the current user interface, navigating to the next user-interface layer in the particular user-interface branch of the current user interface; and
   by the computing device, when the type of the touch event is a downward touch event and there is a previous sub user-interface layer in the particular user-interface branch of the current user interface, navigating to the previous user-interface layer in the particular user-interface branch of the current user interface.

2. The method of claim 1, further comprising when the type of the touch event is a tap event, navigating directly to the home user-interface layer.

3. The method of claim 1, wherein determining the touch event to be an upward touch event or a downward touch event is based one or more of:
- the location of the touch event on the back-mounted touchpad;
- the direction of the touch event on the back-mounted touchpad; and
- the duration of the touch event on the back-mounted touchpad.

4. The method of claim 1, wherein the application is a web browser.

5. The method of claim 1, wherein the application is an operating system.

6. The method of claim 1, wherein the back-mounted touchpad comprises a concave surface.

7. A device comprising:
- a display;
- a back-mounted touchpad;
- one or more processors; and
- a memory coupled to the processors comprising instructions executable by the processors, the processors being operable when executing the instructions to:
  - detect a touch event on the back-mounted touchpad of the device during display of a current user interface of an application executing on the computing device, wherein the application comprises a navigation hierarchy that comprises a home user-interface layer, a plurality of sub user-interface layers, and a plurality of user-interface branches;
  - determine a particular sub user-interface layer and user-interface branch that the current user interface corresponds to;
  - determine a type of the touch event;
  - when the type of the touch event is an upward touch event and there is a next sub user-interface layer in the particular user-interface branch of the current user interface, navigate to the next user-interface layer in the particular user-interface branch of the current user interface; and
  - when the type of the touch event is a downward touch event and there is a previous sub user-interface layer in the particular user-interface branch of the current user interface, navigate to the previous user-interface layer in the particular user-interface branch of the current user interface.

8. The device of claim 7, wherein the processors are further operable when executing the instructions to when the type of the touch event is a tap event, navigate directly to the home user-interface layer.

9. The device of claim 7, wherein the processors are operable when executing the instructions to determine if the touch event is an upward touch event or a downward touch event based on one or more of:
- the location of the touch event on the back-mounted touchpad;
- the direction of the touch event on the back-mounted touchpad; and
- the duration of the touch event on the back-mounted touchpad.

10. The device of claim 7, wherein the display is a touch screen.

11. The device of claim 7, wherein the back-mounted touchpad comprises a concave surface.

12. The device of claim 7, wherein the application is a web browser.

13. The device of claim 7, wherein the application is an operating system.

14. One or more computer-readable non-transitory storage media embodying software that is operable when executed to:
- detect a touch event on a back-mounted touchpad of the computing device during display of a current user interface of an application executing on the computing device, wherein the application comprises a navigation hierarchy that comprises a home user-interface layer, a plurality of sub user-interface layers, and a plurality of user-interface branches;
- determine a particular sub user-interface layer and user-interface branch that the current user interface corresponds to;
- determine a type of the touch event;
- when the type of the touch event is an upward touch event and there is a next sub user-interface layer in the particular user-interface branch of the current user interface, navigate to the next user-interface layer in the particular user-interface branch of the current user interface; and
- when the type of the touch event is a downward touch event and there is a previous sub user-interface layer in the particular user-interface branch of the current user interface, navigate to the previous user-interface layer in the particular user-interface branch of the current user interface.

15. The media of claim 14, wherein the software is further operable when executed to when the type of the touch event is a tap event, navigate directly to the home user-interface layer.

16. The media of claim 14, wherein the software is operable when executed to determine if the touch event is an upward touch event or a downward touch event based on one or more of:
- the location of the touch event on the back-mounted touchpad;
- the direction of the touch event on the back-mounted touchpad; and
- the duration of the touch event on the back-mounted touchpad.

17. The media of claim 14, wherein the application is a web browser.

18. The media of claim 14, wherein the application is an operating system.

19. The media of claim 14, wherein the back-mounted touchpad comprises a concave surface.

* * * * *